United States Patent [19]
Amstutz

[11] Patent Number: 4,597,250
[45] Date of Patent: Jul. 1, 1986

[54] METHOD OF AN ARRANGEMENT FOR PREPARATION OR CONDITIONING OF AGRICULTURAL PRODUCT

[75] Inventor: Jean-Pierre Amstutz, Birr, Switzerland

[73] Assignee: Bucher-Guyer AG, Niederwenigen, Switzerland

[21] Appl. No.: 458,753

[22] Filed: Jan. 17, 1983

[30] Foreign Application Priority Data

Jan. 26, 1982 [CH] Switzerland ............... 462/82
Apr. 1, 1982 [CH] Switzerland ............. 2008/82

[51] Int. Cl.$^4$ ........................................... A01D 43/10
[52] U.S. Cl. ........................................... 56/16.4; 56/1; 56/13.6
[58] Field of Search .................. 56/16.4, 1, 6, 13.6; 426/237, 239, 242, 244; 99/451, 483, DIG. 13

[56] References Cited

U.S. PATENT DOCUMENTS 1,959,390  5/1934  Smith ........................ 426/244
2,661,784 12/1953  McMillan ................... 426/244

FOREIGN PATENT DOCUMENTS 19383 of 1929  Australia ..................... 426/244
1950761  4/1970  Fed. Rep. of Germany .... 56/DIG. 23

Primary Examiner—Gene Mancene
Assistant Examiner—David I. Tarnoff
Attorney, Agent, or Firm—Marmorek, Guttman & Rubenstein

[57] ABSTRACT

A method of preparation or conditioning of stalk agricultural products includes formation of a field or a space in which an electrical potential difference forms current- and spark shocks. An arrangement includes supports provided with electrodes which are arranged in pairs opposite to one another, and the support forms therebetween a feeding passage for the product. One of the supports can be formed as a driven organ. The arrangement can be associated with a mowing mechanism.

70 Claims, 9 Drawing Figures

METHOD OF AN ARRANGEMENT FOR PREPARATION OR CONDITIONING OF AGRICULTURAL PRODUCT

BACKGROUND OF THE INVENTION

The present invention relates to a method of preparation or conditioning of agricultural stalk product, as well as to an arrangement for carrying out the method.

Methods of preparation or conditioning are used for faster fodder drying in the case of tedded harvest, or shorter drying time in the case of utilization of the fodder as silo product. In one known method the cut product is taken up with a so-called squeeze tedder by the lower squeeze roller of a pair of oppositely rotating rollers located one under the other, and is passed between the rollers. At least one of the rollers is provided with longitudinally directed strips which squeeze the passing fodder on the neighboring rollers. Such arrangements are followed till last time by the mowing mechanisms, so that the fodder is directly guided to the mowing by the squeezing rollers.

In accordance with another known method the agricultural product is taken up immediately after mowing by a strike and feed drum and passed through an overshot conditioning passage which is formed by the drum and guide hood arranged above and at a distance from the latter. The product is subjected in this passage to the impacting action of the drum and baffles extending into the conditioning passage.

The above-mentioned methods of mechanical preparation have, however, great disadvantages in that the frequent impacting of the fodder results in tearing or striking off of the nutritiously-rich foliage. Because of its relatively small size the subsequent collecting devices and arrangements, such as load carriages, can no longer take it up. In addition, fragmentative losses take place. Finally, the arrangements with squeezing rollers have a tendency for clogging, i.e., the fodder falls back onto the ground or cannot be taken up and remains untreated on the ground.

SUMMARY OF THE INVENTION

Accordingly, it is an object of the present invention to provide a method of preparation or concentration of stalk agricultural products, which avoids the disadvantages of the prior art and provides for high conditioning action with improved fodder treatment.

In keeping with these objects and with others which will become apparent hereinafter, one feature of the present invention resides, briefly stated, in a method in accordance with which a stalk agricultural product is passed through a field or a space provided with a potential difference for a spark or current shock.

It is also advantageous when, in accordance with the invention, the potential difference provided between at least two poles is formed by a generated electrical charge in the ground.

An arrangement in accordance with the invention has at least two electrodes spaced at a distance from and facing toward one another as well as connected with an electrical source, so that the agricultural product is passed between the electrodes.

With the utilization of a forwardly travelling mowing mechanism with insulated arrangements, the potential difference is provided between a charge carrier and the mowing mechanism which is supported on slides on the ground, whereby shortening and lower charging of the whole arrangement can be obtained.

When a mowing mechanism is used in such an arrangement, the weight of the machine and the manufacturing expenditures for a mow conditioning arrangement are considerably reduced. Simultaneously, the mechanical wear is considerably decreased.

The novel features of the present invention are set forth in the appended claims. The invention itself, however, will be best understood from the following description of preferred embodiments which is accompanied by the following drawings.

BRIEF DESCRIPTION OF THE VIEWS

DESCRIPTION OF A PREFERRED EMBODIMENT

Figure 1:
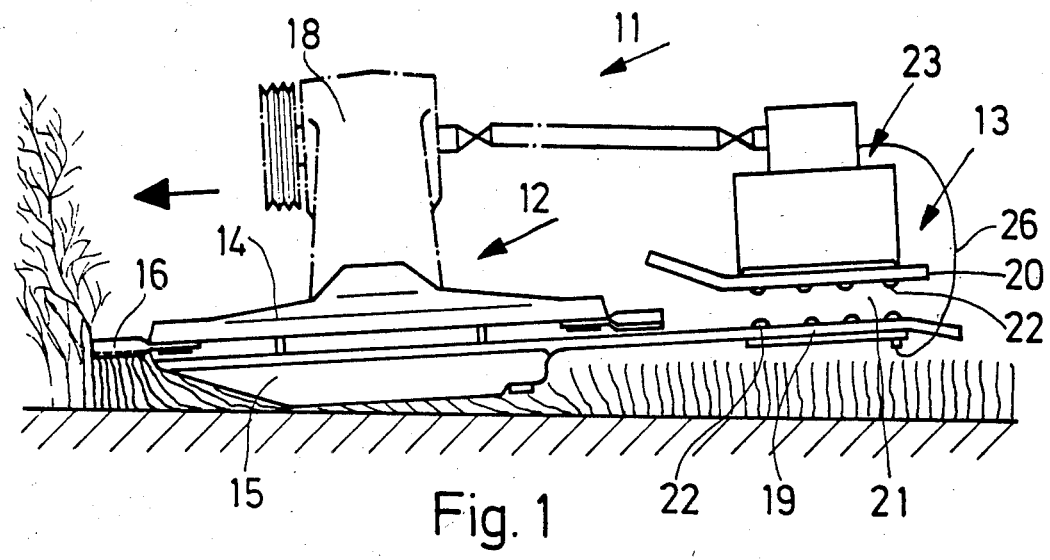
FIG. 1 is a schematic side elevational view of a conditioning arrangement mounted behind a mowing mechanism, in accordance with an embodiment of the invention taken along line I—I in FIG. 2.
Figure 2:
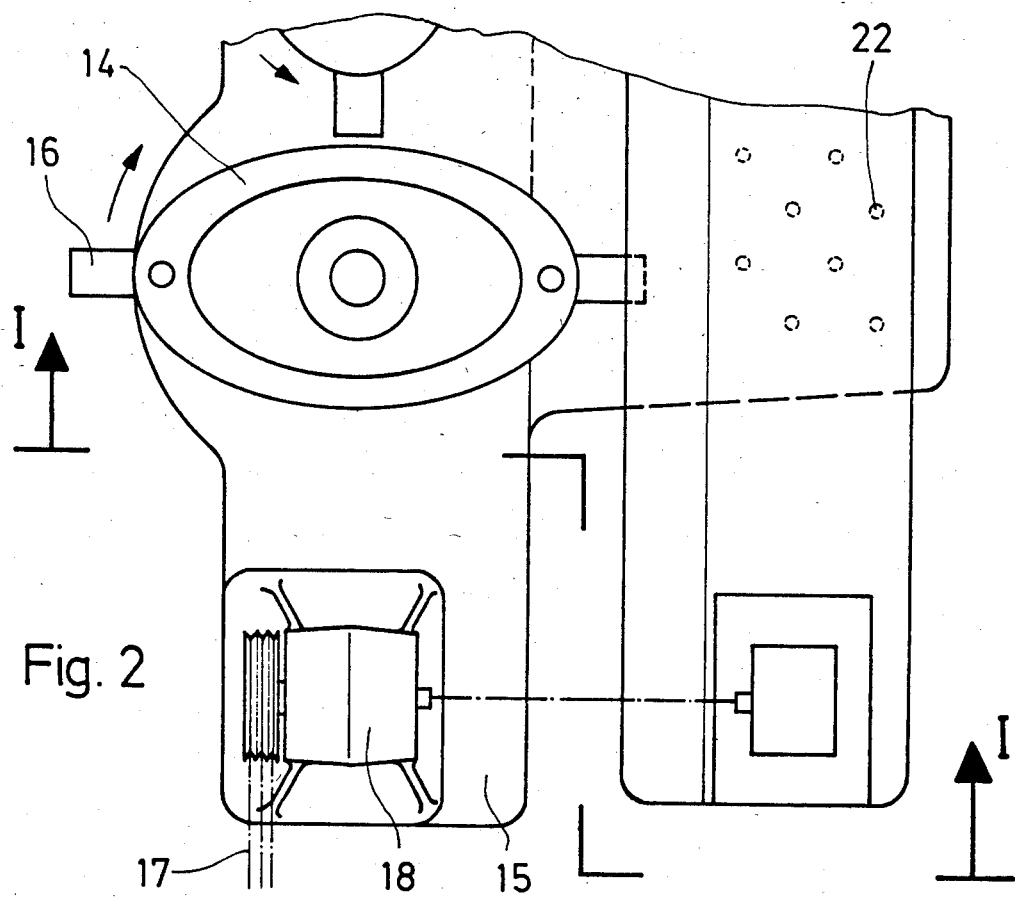
FIG. 2 is a plan view of the arrangement of FIG. 1.

FIG. 1 shows a mow conditioning arrangement which is identified as a whole with reference numeral 11. It includes a disk mowing mechanism 12 mounted on a three-point trailing device of a tractor or another tractive machine, and a conditioning device 13 mounted at the rear side of the disk mowing mechanism. The mowing mechanism 12 has several oval disks 14 that are rotatable about a vertical axis and supported in a housing 15 which is flat, transverse to a travelling direction, and is glidingly supported on the ground. The disks are provided in the region of their maximum diameter with cutting blades 16. The drive of the disks 14 is carried out positively by means of a (not shown) transmission which is arranged in the housing 15 and driven by a pull transmission connected to the power take-off shaft of the tractor or by a cardan shaft. For deviating the driving force, a further transmission 18 is provided in a conventional manner on the mowing mechanism at its side facing towards the tractor. The disks 14 rotate in pairs in opposite directions.

The conditioning device 13 is connected to the mowing mechanism at its rear side and mounted in the housing 15. The conditioning device is formed by two supporting plates 18 and 20 which extend transverse to the travelling direction at a distance from one another and are provided with electrodes 22 to form a field generating means for establishing a current and spark shock by an electrical potential difference. The supporting plates form a height-limited feeding passage for passing therethrough of a stalk agricultural product which comes from the mowing mechanism. Several electrodes 22 are arranged on the walls of the supporting plates 19 and 20 and in the feeding passage 21 so as to face toward one another.

For providing proper conditioning of different fodders, the distance between the electrode supporting elements 19, 20, 24 and 25 or the average cross section of the feeding passage is formed variable. An adjusting device such as, for example, a spindle drive, a releasable screw drive and the like is provided. Advantageously, the electrodes 22 form with the walls of the feeding passage 21 an approximately smooth or flush surface. Thereby the passage 21 is free from any obstacle to the fodder passing during its transport through the passage. Advantageously, the upper supporting plate 20 is bent or buckled upwardly at the front side of the feeding passage 21 so as to facilitate entrance of the fodder into the feeding passage 21.

The electrodes 22 are arranged on the upper and lower supporting plates 20 and 19 so that they are distributed over the surfaces of the plates. It should be mentioned that one upper electrode and one lower electrode form an electrical potential difference and must advantageously be located at a shortest possible distance from one another. Advantageously, the electrodes are located at equal distances and in rows extending transverse to the travelling direction.

The electrical potential on the electrodes 22 are produced by one or several generators or magnetic ignitors 23 driven by the power take-off shaft of a tractor. The potentials on the electrodes 22 are approximately identical over the supporting plates 19 and 20.

The conditioning or preparation of the agricultural product is carried out by firing power with an electrical high voltage between the electrodes. The firing power is generated by known devices such as, for example, in the internal combustion engines. With the known electronic ignition devices it is possible to obtain high electrical voltage considerably above 40,000 volts and a great shock width. The magnetic ignition of the type used here is known as a Bosch type.

The magnetic ignitor is composed of a rotatable magnet wheel provided with permanent magnets and driven with the conditioning device 13 via a transmission from a power take-off shaft of the tractor directly or from a drive shaft of the mowing mechanism. A plate composed of aluminum is arranged concentrically to the rotatable magnet wheel and supports the ignitor armature, breaker and condenser. The breaker is frequently actuated by a cam on the hub of the magnet wheel. Other constructions of this type are not mentioned here, since they have no inventive features.

With the closed breaker, induction current is generated in the primary winding of the ignitor armature. The induction current is broken in the moment of ignition in its highest value by opening of the contacts of the breaker. Now by changing the magnetic flux, an induced high voltage is produced in the secondary winding of the ignitor armature and lead to spark transition on the electrodes 22 connected in current-conductive manner with the ignitor armature. Transistor-spool ignitors are also known which are controlled in contactless manner and can also be used in the inventive conditioning arrangement.

The spark shock between the electrodes is produced by the potential difference and high voltage. Because of the electrodes flux from the electrode with a smaller potential to the electrode with a greater potential an ionizing intermediate space is produced and forms a carrier of energy which is released in shock-like manner.

Since in the event of higher fodder consistency in the feeding passage an electrical connection between the electrodes 22 can be established through the tightly lying agricultural product, a current shock instead of the spark shock is produced. Such a current shock heats the cells until their disruption and provides drying of the agricultural product in a high mass.

The electrical potential difference is attained, on the one hand, by the generated high voltage and the mass on the stationary part of the magnetic ignitor. Both can be selectively connected with the electrode pairs, i.e., the spark can transit both from the upper supporting plate 20 to the lower supporting plate 19, and vice versa. It is also possible that the connection on the electrodes is performed alternately, so that the spark transition takes place from above downwardly and from below upwardly between the supporting plates.

Figure 3:
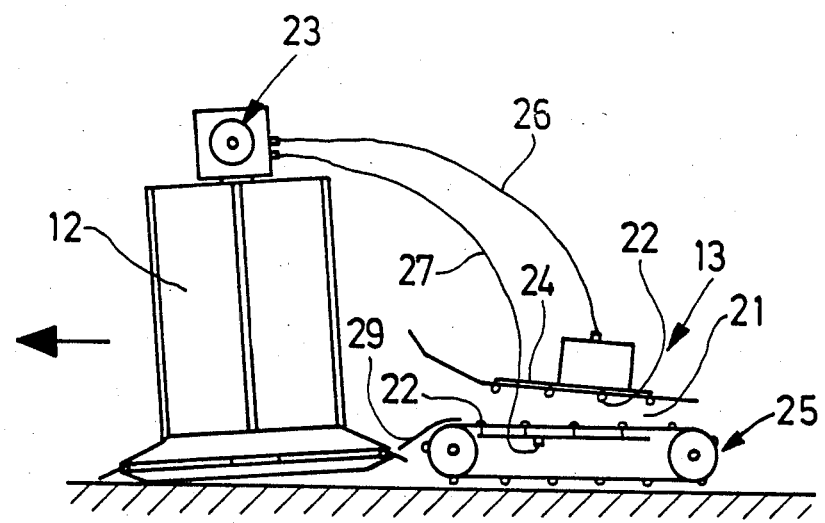
FIG. 3 is a schematic side elevational view of a centrifugal mowing mechanism mounted behind the conditioning arrangement.

In the embodiment shown in FIG. 3 a drum moving mechanism 12 is provided instead of the disc mowing mechanism. It is also possible to use finger and band mowing mechanisms. The conditioning device 13 is provided with a stationary electrode support 24 which limits the feeding passage from above. It also has a movable electrode support 25 formed as a conveying band for limiting the feeding passage from below. The ignition is produced by a generator or magnetic ignitor which is connected with the drive shaft. The electrodes 22 of the electrode supports 24 and 25 are connected or connectable with the magnetic ignitor via electrical conductors 26 and 27. At their rear side the electrodes 22 slide over a contact disk 28 which is connected with a current source in current-conductive manner. Advantageously the magnetic ignitor 23 and the movable electrode support 25 are switched synchronously, so that the electrodes in the moment of the spark shock lie opposite to one another. For improving the fodder flow, a conductive sheet 29 is provided between the drum mowing mechanism 12 and the conditioning device 13, and the upper electrode support 24 is bent upwardly at its front side.

Figure 4:
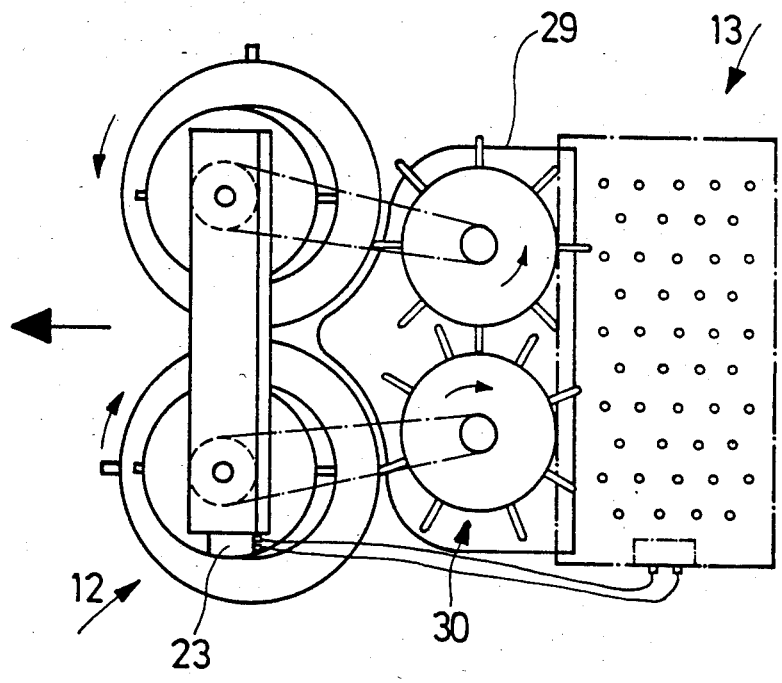
FIG. 4 is a plan view of the embodiment shown in FIG. 3 with the mowing mechanism and the distributing arrangement mounted behind.

FIG. 4 shows a drum mowing mechanism 12 with a conditioning device formed as a bird's eye. It is known that such a mowing mechanism has a tendency to form smaller fodder streams, so that the conditioning effect of the produced fodder does not reach desired results. For eliminating these disadvantages, a distributing device is arranged between the mowing mechanism 12 and the conditioning device 13. As shown in the drawing, the distributing device includes two oppositely rotatable prong drums 30 which engage the fodder behind the mowing mechanism and distribute it similarly to a centrifugal turner, to a greater width, so that it runs in a thinner layer through the conditioning device 13. The drive of this winder-like device, which is similar to a centrifugal turner, is provided from the mowing drum via a pull transmission. A guiding sheet 29 is arranged at the rear side of the mowing mechanism for preventing fodder losses.

For improving the above mentioned properties, it is also possible, instead of the distributing device 30 which increases the machine weight, to provide the conditioning device 13 both with a vertical and also with a horizontal current and spark shock parallel to the bottom. In this case the electrode supports are assembled so as to form a box-shaped feeding passage 21 located in the fodder flow. The intensity of the current and spark shocks can thereby be considerably increased.

Figure 5:
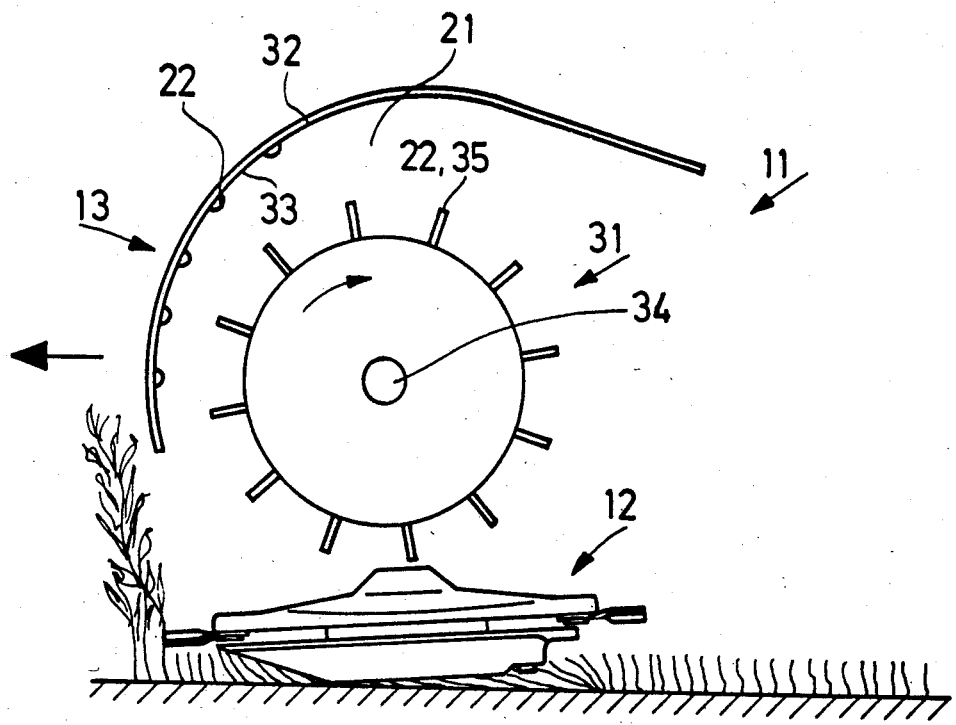
FIG. 5 is a side elevational view of a mow conditioning arrangement with an overshot feeding passage as a conditioning device in accordance with the invention.

FIG. 5 shows a mow conditioning arrangement 11 which has a disk mowing mechanism 12 and a feeding rotor 31 arranged under the latter. The feeding rotor 31 forms together with a hood 32 an overshot feeding passage 21 for conditioning of the through flowing agricultural product. The hood 32 has at least approximately smooth inner wall 33. The electrodes 22 are arranged on the inner wall 33 and face toward an axis 34 of the feeding rotor 31. The feeding rotor 31 can have a drum-like outer wall with feeding prongs which extend substantially radially and form the electrodes. The feeding prongs are distributed over the circumference of the outer wall advantageously at regular distances. The spark shock is obtained in analogous manner as in the above described conditioning arrangements. For preventing the effect of a mechanical rupturing as much as possible, slightly projecting electrodes 22 can be provided on the feeding rotor 31 instead of the prong-like electrodes. In this embodiment the number of the prongs can be reduced to a minimum. The feeding rotor 31 is advantageously provided with a relatively high number of revolutions. Thereby the electrode peaks under the action of centrifugal force and does not settle on the outer wall of the feeding rotor.

It is also possible to provide a feeding rotor which has no outer wall or casing. This embodiment of the feeding rotor also requires a relatively high fodder speed in the feeding passage 21.

The fodder is subjected to an intensive conditioning when the feeding rotor 31 and the ignitor are controlled synchronously, i.e., when the spark shock time and the speed of the movable electrodes 22 correspond to each other, so that in each mutually opposite position of the electrodes a spark can take place.

Figure 6:
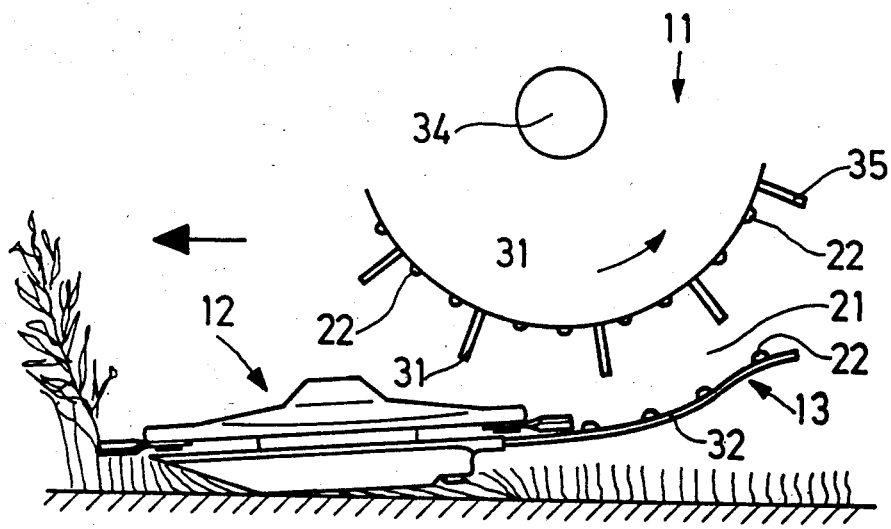
FIG. 6 is a side elevational view of a mow conditioning arrangement with an undershot feeding passage as a conditioning device.

This is also true for the mow conditioning arrangement 11 shown in FIG. 6. In contrast to the arrangement of FIG. 5, it has an undershot passage 21. The undershot passage has the advantage since because of the gravitation which acts on the fodder, the centrifugal force of the higher rotation not need to be used and thereby the fodder remains for a longer time in the feeding passage 21 to be subjected to more intensive conditioning action.

For optimization of the conditioning action, one embodiment of the inventive arrangement can be connected in series with a mowing mechanism, i.e., the current and spark shock is applied to the standing agricultural product. It is, however, advantageous when the electrodes 22 are arranged so that they act upon the agricultural product immediately before the cut. Such a conditioning arrangement can be provided for this purpose with the electrodes 22 projecting in the direction of movement and insulated approximately to their free ends, so that the current and spark shock propagate transverse to the movement of the machine.

It is also possible to use the conditioning arrangement without the mowing mechanism or additional take-up organs. Particularly, with the embodiments of FIGS. 3 and 5, the previously cut fodder can be conditioned in a second working step.

Figure 7:
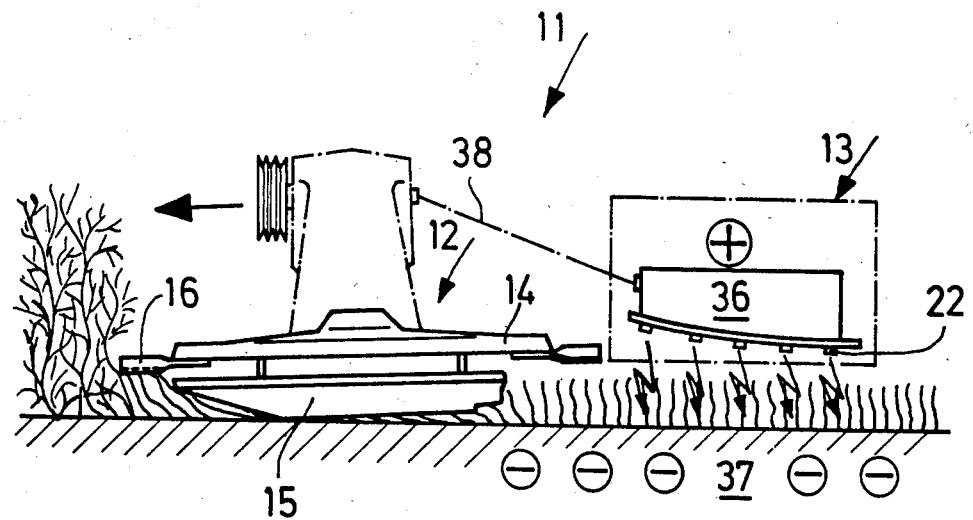
FIG. 7 is a schematic side elevational view of the arrangement with a forwardly mounted mowing mechanism.

A mow conditioning arrangement 11 of FIG. 7 has a disk mowing mechanism 12 mounted on a tractor or another traction machine, and the inventive conditioning device 13 which follows the same. Advantageously, the conditioning device is assembled with the mowing mechanism. The mowing mechanism 12 has several disks 14 rotatable about vertical axes and having cutters 16 mounted at their periphery. The disks are supported in a flat housing extending transverse to the travelling direction and slidingly supported on the ground.

The drive of the disks 14 is carried out positively via a (not shown) transmission which is arranged in the housing 15 and driven via a pull transmission connected with the power take-off shaft of the tractor or a cardan shaft. The conditioning device 13 connected with the mowing mechanism serves for forming the current and spark shock by an electrical potential difference which is formed between a charge carrier 36 and the ground 37. The charge carrier 36 has at its lower side several electrodes 22 facing toward the ground and distributed over the width of the fodder flow.

The fodder which comes from the mowing mechanism through the space formed between the charge carrier and the ground is subjected to the jumping-over current and spark shocks in the sense of desired conditioning. The electrical charge in the charge carrier 36 can be produced via a shaft 38 connected with the mowing mechanism to drive the latter. The control of the periodical current or spark transitions can be carried out by a (not shown) ignition device.

The conditioning of the fodder is performed with electrical high voltage. With known electronic ignition device, electrical voltage of more than 40,000 volt with a great shock width can be attained. The operation of the magnetic ignitor is not described here, since it is not germane for the invention. It is referred to in connection with this to the preceding text in its respective part. Transistor-spool ignitors which are controlled in contactless manner are also known and can be utilized in the above described conditioning arrangement.

The energy released in shock-like manner in form of spark shock or current shock is produced by the difference of potentials between the electrode 22 connected with the charge carrier 36 and the ground. The release takes place at a predetermined value of the potential difference or the pole distance of the pole. In the event of high fodder consistency it is possible to perform the transition of the current and spark through the agricultural product because of the current connection. The current shock heats the agricultural product and performs an accelerated drying.

Instead of a disk mowing mechanism 12, a drum mower, finger mower or band mower can also be used. The last two of them are advantageously provided, because of their massive fodder transport, with a conveyor such as a winch. Mowing mechanisms and conditioning devices can be also mounted separately on the tractor. For example, the mowing mechanism is connected with a side rear mount or formed as a front mower, and the conditioning device is formed as a rearwardly drawn device behind the tractor. The conditioning can also be performed in a second working step with a conditioning device independent on mowing with a preconnected take-up organ, which altogether leads to higher energy expenditures.

Figure 8:
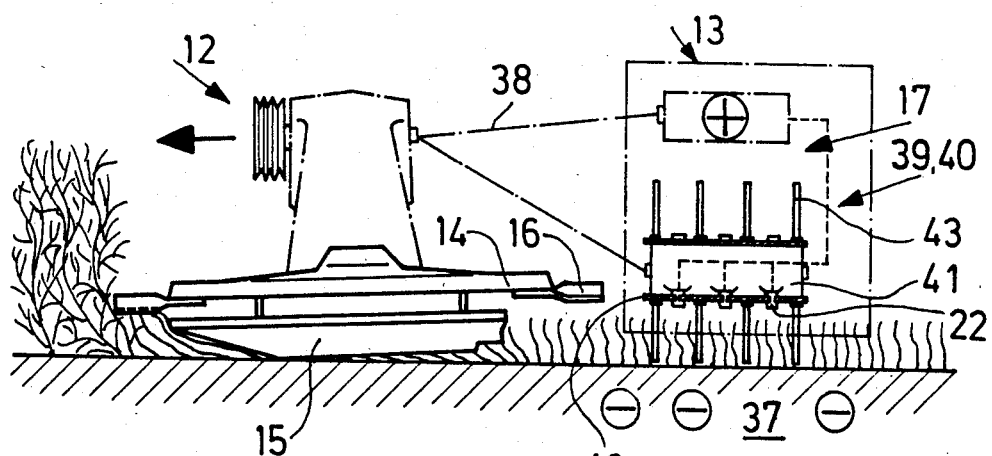
FIG. 8 is a side elevational view similar to FIG. 7, but embodying a modification showing the arrangement with a forwardly mounted mowing mechanism.

For forming a swath of the conditioned fodder and providing an excellent space behind the mowing mechanism, a drivable transport organ 39 can be used which is conductively connected with the charge carrier 36. Such an arrangement is shown in FIG. 8. In this arrangement, the transport organ 39 is formed as an endless band raking organ 40, reextending transverse to the travelling direction. Projecting raking prongs 43 are mounted on a band 42 which runs around two rollers. They transport laterally the fodder flowing from the mowing mechanism. During this lateral transport the current transitting in a spark-like manner by the electrodes arranged between the raking prongs 43 on the band 42 breaks the fodder. The electrodes 22 are connected in current-conductive manner with the charge carrier 36. For current transmission, devices similar to current-collecting rails or sliding devices are used.

The periodical emission of the current on the electrodes 22 is produced by a breaker control. Advantageously, the raking prongs 43 are formed of electrically non-conductive material, such as a synthetic plastic material and the like.

Figure 9:
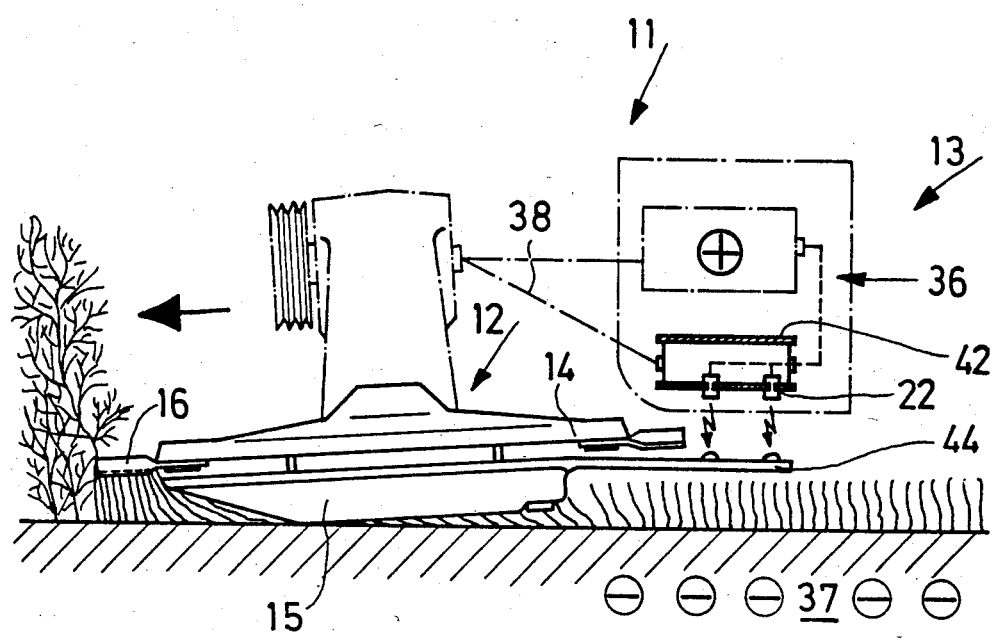
FIG. 9 is a side elevational view similar to FIG. 7, but embodying a further modification of the arrangement with a forwardly mounted mowing mechanism.

FIG. 9 is a view showing another embodiment in which the mowing mechanism 12 is provided at the rear side with an extension plate 44. The plate which is in connection with the ground, serves for forming the potential difference with the charge carrier 36. The latter is composed in this case of a rotatable band 42 provided with electrodes, but formed without prongs. The extension plate 44 can also be made of a non-metallic or electrically insulated material and provided with slightly projecting electrodes 22. The latter must be connected via a conductor with the ground directly or via the mowing mechanism indirectly.

With a high number of revolutions an intensive treatment of the fodder can be provided, namely a tight spark rain is produced over the width of the fodder flow.

For optimization of the tedding of the agricultural product behind the machine, a rotor directly or indirectly connected to the ground can be used. It transports the fodder through an overshot passage, which is formed by a guiding wall arranged at a distance. The wall is formed as a hood and is provided in at least one part of its active length with a charge carrier 36 or with electrodes 22. Its arrangement and control can be carried out in accordance with the preceding embodiments.

An undershot passage can also be formed in connection with the extension plate 44. In this case the rotor forms the charge carrier 36. In both options of the passages a considerably smooth guiding wall must be provided to prevent the effect of mechanical conditioning.

I wish it be understood that I do not desire to be limited to the exact details of construction shown and described, for obvious modifications will occur to a person skilled in the art.

Having thus described the invention, what I claim as new and desire to be secured by Letters Patent, is as follows:

1. A method for the conditioning of agricultural stalk products by a mowing device, comprising the steps of passing the agricultural stalk products through a region provided with an electrical potential difference for forming an electrical discharge.

2. A method as defined in claim 1, wherein said passing step includes forming the potential difference between two poles by a generated electrical charge and ground.

3. A method as defined in claim 2, wherein said forming step includes generating the electrical charge such that it has a positive potential relative to that of the ground.

4. An arrangement for carrying out the method according to claim 1, characterized in that at least two electrodes which lie opposite each other in pairs are connected to an electrical current source, said electrodes forming an electrical potential difference that is diagonal to the advance movement of the agricultural stalk products.

5. An arrangement as defined in claim 4, wherein said field generating means is arranged to form the electrical potential difference substantially parallel to the ground.

6. An arrangement as defined in claim 4, wherein said electrodes are connected in pairs to said electrical current source.

7. An arrangement as defined in claim 4, wherein said electrical current source is formed by at least one generator.

8. An arrangement as defined in claim 4, wherein said electrical current source is formed by at least one electrical ignitor.

9. An arrangement as defined in claim 4, and further comprising at least two supports arranged to support said electrodes in insulated manner.

10. An arrangement as defined in claim 9, wherein said supports are arranged so that they form a feeding passage for the product.

11. An arrangement as defined in claim 10, wherein at least one of said supports is adjustable and fixable so as to change a cross section of the feeding passage.

12. An arrangement as defined in claim 9, wherein said electrodes have end portions, said supports and said end portions of said electrodes having substantially smooth surfaces.

13. An arrangement as defined in claim 9, wherein said field generating means includes a plurality of said electrodes distributed over substantially the entire surface of said supports.

14. An arrangement as defined in claim 4, wherein said field generating means is arranged so that the current- and spark shocks between said electrodes move in the same direction.

15. An arrangement as defined in claim 4, wherein said field generating means is arranged so that the current- and spark shocks between the electrodes move alternately.

16. An arrangement as defined in claim 9 wherein at least one of said supports is formed as a driven feeding organ.

17. An arrangement as defined in claim 13, wherein the electrodes of at least one of said supports is formed as projecting prongs.

18. An arrangement as defined in claim 17, wherein said prongs have free ends and are coated with an insulation up to the region of their free ends.

19. An arrangement as defined in claim 10, wherein the electrodes located in the region of said feeding passage are connected to said electric current source.

20. An arrangement as defined in claim 4, wherein some of said electrodes are stationary, whereas the other of said electrodes are movable and arranged so that the current- and spark shocks are controlled synchronously between said stationary and movable electrodes.

21. An arrangement as defined in claim 13, wherein there is provided a commutator, one of said supports being movable, the electrodes arranged on said movable supports being connected to said electrical current source by means of said commutator.

22. An arrangement as defined in claim 4, and further comprising a mowing mechanism, said field generating means being arranged behind said mowing mechanism as considered in the travelling direction.

23. An arrangement as defined in claim 22, and further comprising distributing means arranged between said mowing mechanism and said field generating means.

24. An arrangement as defined in claim 4, and further comprising a support for said electrodes that forms a box-shaped feeding passage which surrounds a flow of the product.

25. An arrangement as defined in claim 4, and further comprising a first support arranged to support one of said electrodes and formed as a drivable drum-shaped take-up and feeding organ, and a second support arranged to support the other of said electrodes and formed as a hood spaced apart from said first support for a distance sufficient to form an overshot feeding passage therebetween.

26. An arrangement as defined in claim 25, and further comprising a mowing mechanism, said supports with said electrodes being arranged behind said mowing mechanism as considered in the travelling direction.

27. An arrangement as defined in claim 4, including a mowing mechanism, and further comprising a first support arranged to support one of said electrodes and formed as a drum-shaped drivable take-up and feeding organ, and a second support arranged to support the other of said electrodes and formed as a conductive sheet connected to said mowing mechanism so that said supports form therebetween an undershot feeding passage.

28. An arrangement as defined in claim 5, wherein said field generating means includes a plurality of such electrodes, and further comprising a support arranged to support some of said electrodes and provided with feeding prongs which extend outwardly beyond active ends of the electrodes.

29. An arrangement as defined in claim 4, and further comprising a mowing mechanism, said field generating means being arranged forwardly of aaid mowing mechanism as considered in the travelling direction.

30. An arrangement as defined in claim 4, wherein said field generating means includes a charge carrier arranged at a distance from and facing toward the ground so as to form the potential difference with the latter.

31. An arrangement as defined in claim 30, and further comprising igniting means electrically connected to the charge in the ground to release the current- or spark shock between poles of the potential difference.

32. An arrangement as defined in claim 30, and further comprising a mowing mechanism, said charge carrier being arranged forwardly of said mowing mechanism as considered in the travelling direction.

33. An arrangement as defined in claim 30, and further comprising a take-up organ, said charge carrier being arranged forwardly of said mowing mechanism as considered in the travelling direction.

34. An arrangement as defined in claim 4, wherein said field generating means includes a charge carrier and an element cooperating with the ground and arranged at a distance from said charge carrier to form the potential difference with the latter.

35. An arrangement as defined in claim 34, wherein said element is a mowing mechanism.

36. An arrangement as defined in claim 34, wherein said element is a take-up organ.

37. An arrangement as defined in claim 34, wherein said element is a feeding organ.

38. An arrangement as defined in claim 34, wherein said element is supported on the ground.

39. An arrangement as defined in claim 34, wherein said element is connected to the ground in current-conductive manner.

40. An arrangement as defined in claim 30, wherein said charge carrier is formed as a transporting organ.

41. An arrangement as defined in claim 40, wherein said transporting organ extends in a direction which is transverse to the travelling direction.

42. An arrangement as defined in claim 40, wherein said transporting organ is formed as a drivable endless band which is provided with electrodes connected to the charge of the ground and facing towards the ground.

43. An arrangement as defined in claim 42, and further comprising an organ connected in a current-conductive manner to the ground, said electrodes facing towards said organ.

44. An arrangement as defined in claim 40, wherein said transporting organ is formed as a band raking organ with projecting raking prongs.

45. An arrangement as defined in claim 44, wherein said prongs of said raking organ are composed of electrically non-conductive material.

46. An arrangement as defined in claim 30, wherein said charge carrier is formed as a substantially smooth guiding wall, and further comprising a feeding organ formed as a rotor which is connected to the ground in a current-conductive manner and arranged behind so as to form with said guiding wall at least a portion of an overshot feeding passage.

47. In a method of conditioning an agricultural stalk product by a combined mowing and conditioning device the steps comprising:
conditioning the stalk product by subjecting it to an electric field including a spark action of said combined mowing and conditioning device.

48. A method according to claim 1, 2, or 3, characterized in that the agricultural product is traversed by an electrical discharge operated at low current in a direction approximately diagonal to the direction of movement of the agricultural stalk product, said electrical discharge deriving from a high electrical potential diiference.

49. A method for mowing and conditioning an agricultural stalk product by a combined mowing and conditioning device, comprising the steps of mowing said agricultural stalk product and thereafter passing said agricultural product through a region of said combined mowing and conditioning device having an electrical field therein.

50. A method in accordance with claim 49 wherein said electric field has an electrical potential difference for creating an electrical discharge in said region.

51. The method of claim 49 wherein said electric field is generated between two poles, one of said poles being the ground.

52. The method of claim 49 wherein said electric field has a positive potential relatve to that of the ground.

53. An arrangement for conditioning an argicultural stalk product, comprising mowing means for mowing said agricultural stalk product, and field generating means for forming an electrical field in a region through which said agricultural stalk product passes.

54. An arrangement in accordance with claim 53, wherein said field generating means provides an electrical potential difference for creating an electrical discharge in said region through which said agricultural stalk product passes.

55. An arrangement in accordance with claim 53 wherein said field generating means includes at least two electrodes spaced apart from and opposite each other and an electrical current source with which said electrodes are connected.

56. An arrangement in accordance with claim 55 wherein said field generating means includes a plurality of said electrodes arranged in pairs so that the electrodes of each pair are located opposite to one another and form a potential difference.

57. An arrangement in accordance with claim 54 wherein said agricultural stalk product passes in a predetermined direction, said field generating means being arranged to form the electrical potential difference substantially transverse to said direction.

58. An arrangement in accordance with claim 56 wherein said electrodes are connected in pairs to said electrical current source.

59. An arrangement in accordance with claim 55 wherein said electrical current source is formed by at least one electrical generator.

60. An arrangement in accordance with claim 55 wherein said electrical current source is formed by at least one electrical ignitor.

61. An arrangement in accordance with claim 55 further comprising at least two supports arranged to support said electrodes in insulated manner.

62. An arrangement in accordance with claim 61 wherein said supports are arranged sd that they form a feeding passage for said agricultural stalk product.

63. An arrangement in accordancd with claim 62 wherein at least one of said supports is adjustable and fixable so as to change a cross section of the feeding passage.

64. An arrangement in accordance with claim 61 wherein said electrodes have end portions, said supports on said end portions of said electrodes having substantially smooth surfaces.

65. An arrangement in accordance with claim 61 wherein said field generating means includes a plurality of said electrodes distributed over substantially the entire surface of said supports.

66. An arrangement in accordance with claim 55 wherein said field generating means is arranged so that electrical discharges between said electrodes move in the same direction.

67. An arrangement in accordance with claim 55 wherein said field generating means is arranged so that said electrical discharges between the electrodes move alternately.

68. An arrangement in accordance with claim 62 wherein said electrodes located near said feeding passage are connected to said electric current source.

69. An arrangement in accordance with claim 54 wherein said field generating means is located downstream from said mowing means.

70. An arrangement in accordance with claim 61 wherein said supports with said electrodes are located downstream from said mowing means.

* * * * *